United States Patent [19]

Iwata

[11] Patent Number: 4,749,056

[45] Date of Patent: Jun. 7, 1988

[54] SENSOR OF THE THEFT AND THE LIKE OF AN AUTOMOBILE

[75] Inventor: Keisuke Iwata, Tokyo, Japan

[73] Assignee: Kabushiki Kaisha Iwata Electric, Tokyo, Japan

[21] Appl. No.: 21,633

[22] Filed: Mar. 4, 1987

[30] Foreign Application Priority Data

Jan. 22, 1987 [JP] Japan ................................. 62-8121[U]

[51] Int. Cl.⁴ ........................ G08B 21/00; B60R 25/00
[52] U.S. Cl. ..................................... 180/287; 340/65; 307/10 AT; 180/282
[58] Field of Search ........................... 340/65, 63, 547; 307/10 AT; 180/282, 287

[56] References Cited

U.S. PATENT DOCUMENTS

| 3,566,350 | 2/1971 | Kahn | 340/65 |
| 4,151,507 | 4/1979 | Willis | 180/287 |
| 4,450,326 | 5/1984 | Ledger | 340/65 |
| 4,584,569 | 4/1986 | Lopez et al. | 340/65 |

Primary Examiner—Richard A. Bertsch
Attorney, Agent, or Firm—Bauer & Schaffer

[57] ABSTRACT

In this sensor, a weight having a permanent magnet is fitted substantially in the middle of an elastic film fixed at the ends and a hall element or magnetic resistance element is arranged so as to be opposed at a proper spacing to the permanent magnet of the weight.

7 Claims, 3 Drawing Sheets

SENSOR OF THE THEFT AND THE LIKE OF AN AUTOMOBILE

FIELD OF THE INVENTION

This invention relates to a sensor of the theft and the like of an automobile fitted in such proper place as within the engine compartment, chassis, room or trunk of an automobile to generate a signal by sensing a vibration at such time as of the theft of the automobile, that is, a vibration of the automobile artificially applied by removing the tire, breaking the window glass or inserting the key into the key hole of the door or trunk and to thereby prevent the theft or the like of the automobile as combined with any car alarm and the like.

BACKGROUND OF THE INVENTION

As a sensor of the theft and the like of an automobile generating a signal by sensing a vibration at the time of the theft and the like of the automobile, there is already provided a sensor shown in FIG. 7 wherein the reference numeral 1 represents a housing body, 2 represents an elastic string provided as stretched to the housing body 1, 3 represents a weight provided in the middle of the elastic string 2 and provided with a permanent magnet 4 exposed on the lower surface and a copper winding coil 5 is provided below the above mentioned weight 3.

This sensor is fitted to a proper part of an automobile. The principle of the vibration of this sensor is of a torsion bar system with the elastic string 2 as an axis so that, when the automobile vibrates, the weight 3 will become a pendulum swinging with the elastic string 2 as an axis, the magnetic flux intersected with the copper winding coil 5 by the permanent magnet 4 of the weight will vary, an induction current will be generated in the copper winding coil 5 and the theft and the like of the automobile will be thereby sensed.

However, with this sensor, there has been a defect that, in such case that the automobile is greatly inclined as parked, when the surface on which the above mentioned copper winding coil 5 is arranged greatly inclines, the weight 3 will be rotated to be directed in the perpendicular direction by the gravity, the permanent magnet 4 will separate away from the copper winding coil 5 and therefore the sensitivity will reduce. Also, there has been a defect that, in case the car is parked above high voltage lines embedded under the ground or in case a transmitting antenna generating strong electromagnetic waves is located in the vicinity, an induction current will be generated in the above mentioned copper winding coil 5 under the influence of an electromagnetic induction from outside and the sensor will mis-operate or will be made inoperative by an excess input.

SUMMARY OF THE INVENTION

The present invention has it as an object to provide a sensor of the theft and the like of an automobile having no fear of mis-operating under the influence of an electromagnetic induction from outside as by high voltage lines embedded under the ground or a transmitting antenna generating strong electromagnetic waves or of being made inoperative by an excess input.

Therefore, the present invention is of a formation wherein a weight having a permanent magnet is fitted substantially in the middle of an elastic film fixed at both ends and a hall element or magnetic resistance element is arranged as opposed at a proper spacing to the permanent magnet of the weight.

The sensor of the present invention is fitted to a proper part of an automobile. Therefore, in the present invention, as the weight is fitted substantially in the middle of the elastic film fixed at the ends, when the car body vibrates, the above mentioned weight will be vibrated by the action of the above mentioned elastic film. As the weight has the permanent magnet and the hall element or magnetic resistance element is arranged as opposed to the permanent magnet of the weight, an alternating current voltage corresponding to the vibration frequency of the above mentioned weight will be obtained from the hall element or magnetic resistance element and the theft and the like of the automobile will be thereby sensed.

According to the present invention, there is obtained an advantage that, as the weight is fitted to the elastic film instead of such torsion bar system as in the above mentioned conventional sensor, even if the car body is greatly inclined as parked and the above mentioned elastic film surface greatly inclines with respect to the horizontal surface, the relative positions of the permanent magnet of the weight and the hall element or magnetic resistance element will not substantially vary and therefore the sensitivity will not substantially reduce.

Also, according to the present invention, there is obtained an advantage that, as the hall element or magnetic resistance element is used as a sensing part and such copper winding coil as in the above mentioned conventional sensor is not used, there is no fear of mis-operating under the influence of an electromagnetic induction from outside by such as high voltage lines embedded under the ground or a transmitting antenna generating strong electromagnetic waves or of being made inoperative by an excess input.

DESCRIPTION OF THE PREFERRED EMBODIMENTS

Figure 1:
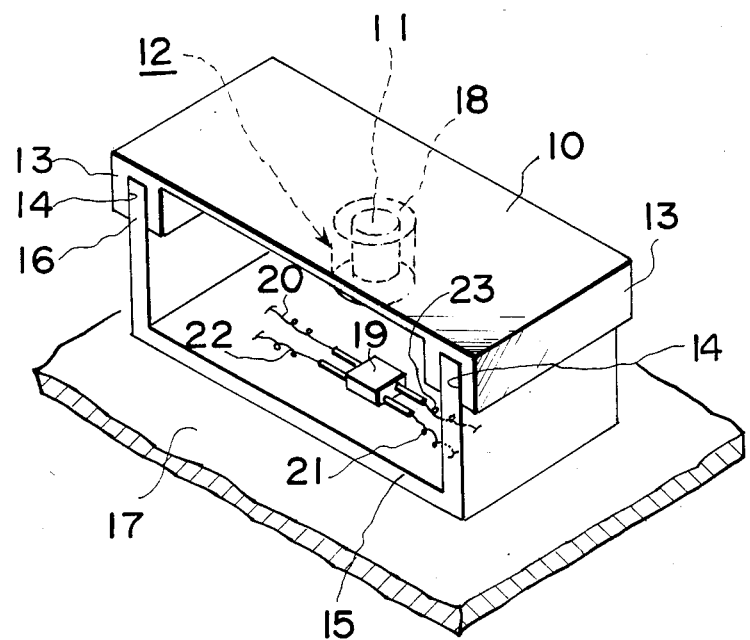
FIG. 1 is a perspective view showing an essential part of an embodiment of the sensor of the theft and the like of an automobile of the present invention.

The present invention shall be described in detail in the following on the basis of the embodiments shown in the drawings.

Figure 2:
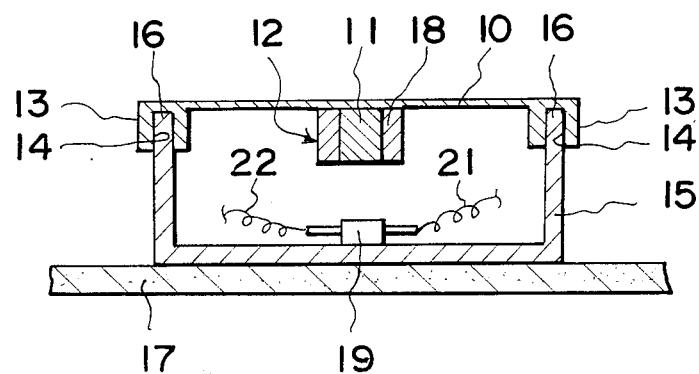
FIG. 2 is a vertically sectioned view of the same.

FIG. 1 is a perspective view showing an essential part of an embodiment of the sensor of the theft and the like of an automobile of the present invention and FIG. 2 is a vertically sectioned view of the same.

In FIGS. 1 and 2, the reference numeral 10 represents an elastic film fixed at both ends and a weight 12 having a permanent magnet 11 is fitted substantially in the middle of the elastic film 10.

Various materials can be used for the above mentioned elastic film 10 but it is preferable to use silicon rubber which exhibits little variation with the lapse of time.

In the case of the embodiment shown in FIGS. 1 and 2, the above mentioned elastic film 10 is formed to be rectangular and has stoppers 13 integrally formed at both ends. A groove 14 of the stopper 13 is fitted to the tip 16 of a supporting base 15 and is bonded with a bonding agent or the like. Needless to say, the elastic film 10 may be fixed at the ends by any method. For example, without forming the above mentioned stoppers 13, the elastic film 10 may be bonded at both ends directly to the tips 16 of the supporting base 15. The elastic film 10 is not limited to be rectangular but can be of such other various forms as are described later.

By the way, though not shown particularly in the drawings, the supporting base 15 is housed together with other component parts in a box-shaped housing body 17 to which the supporting base 15 is fixed. Needless to say, without providing the supporting base 15, the elastic film 10 may be fixed at both ends directly to a wall surface.

In the case of the embodiment shown in FIGS. 1 and 2, a weight 12 is formed of a cylindrical part 18 made of such material high in the specific gravity as lead or solder and a columnar permanent magnet 11 provided in the center of the cylindrical part 18 so as to be exposed on the lower surface. Needless to say, in the present invention, the weight 12 may be provided with the permanent magnet and is not limited in the form. Also, the entire weight 12 may be formed of the permanent magnet. However, it is advantageous and preferable that, as in the embodiment shown in FIGS. 1 and 2, when the weight 12 is formed by using not only the permanent magnet 11 but also the material higher in the specific gravity than the permanent magnet, the sensor will be able to be made smaller as described later. Further, the permanent magnet 11 need not be always exposed and, if a required magnetic flux is applied to the later described hall element 19 or magnetic resistance element from the permanent magnet, the permanent magnet 11 may be embedded in the above mentioned material higher in the specific gravity.

Also, in the present invention, a hall element 19 or magnetic resistance element is arranged as opposed at a proper spacing to the permanent magnet 11 of the above mentioned weight 12.

In the case of the embodiment shown in FIGS. 1 and 2, the hall element 19 is arranged but a magnetic resistance element may be arranged instead of it. By the way, in the drawings, the reference numerals 20 and 21 represent lead wires for impressing a bias voltage on the hall element 19 and 22 and 23 represent lead wires for taking an output signal out of the hall element 19.

By the way, though not shown in the drawings, as the weight 12 will be so greatly vibrated by such large shock as while the automobile is running as to be likely to collide with the hall element 19, it is preferable to provide a buffer material on the opposed surface of the weight 12 or hall element 19.

According to the present invention of the above mentioned formation, the housing body 17 is fitted in such proper place as within the engine room, chassis, room, center pillar or trunk of an automobile directly or by using another metal fitting or the like.

Therefore, when the car body vibrates, the vibration will be transmitted to the elastic film 10 through the housing body 17 and supporting base 15 to vibrate the weight 12. As the weight 12 has the permanent magnet 11 and the hall element 19 is arranged as opposed to the permanent magnet 11 of the weight 12, an alternating current voltage corresponding to the vibration frequency of the above mentioned weight 12 will be obtained from the hall element, that is, through the lead wires 22 and 23 and the theft or the like of the automobile will be sensed.

Therefore, when the output signal (sensing signal) of the hall element 19 is properly processed with such separately provided electric circuit or the like formed, for example, by connecting an amplifier, detector, holding circuit, relay driving circuit and relay in the order mentioned, it will be possible to form a crime preventing alarm device which can sound a buzzer or issue a wireless electric wave signal to inform the car owner or the like of such abnormal matter as jacking up the automobile when the tire is to be stolen, loading the car with a body weight when entering the car, breaking the window glass, inserting the key into the key hole of the door or trunk or colliding with the car from behind or pulling the car while parked.

By the way, in the case of the embodiment shown in FIGS. 1 and 2, as the elastic film 10 is formed to be rectangular and is fixed at both ends, the resonant frequency f of the above mentioned weight 12 will be represented by $$f = \frac{1}{\pi} \sqrt{\frac{T}{lm}}$$

when the mass of the weight 12 is represented by m, the length between both ends of the elastic film 10 is represented by l and its tension is represented by T.

Therefore, the resonant frequency f of the weight 12 can be freely set by varying the length l and tension T of the elastic film 10 and the mass m of the key 12. Now, in order to prevent the mis-operation or the like from being caused by an outside acoustic noise or the like, it is preferable to set the above mentioned resonant frequency f at such low frequency of 20 and several $H_z$ but, in the case of the embodiment shown in FIGS. 1 and 2, as the weight 12 is formed by using not only the permanent magnet 11 but also the material higher in the specific gravity as described above, the mass m of the weight 12 can be made heavier, the resonant frequency f can be set at the above mentioned low frequency without making the length l of the elastic film 10 longer and there is an advantage that the sensor can be made smaller in the form.

According to the present invention, instead of such torsion bar system as in the above mentioned conventional sensor, the weight 12 is fitted to the elastic film 10 and therefore there is an advantage that, even if the car body is greatly inclined while parked and the above mentioned elastic film 10 surface is thereby greatly inclined with the respect to the horizontal plane, the relative positions of the permanent magnet 11 of the weight 12 and the hall element 19 or magnetic resistance element will not substantially vary and therefore the sensitivity will not substantially reduce. Therefore, there are advantages that the sensor of the present invention may be only fitted to an automobile so that the elastic film 10 surface may be substantially horizontal and that it is not necessary to be nervous in order to make the elastic film 10 surface perfectly horizontal at the time of fitting the sensor.

Also, in the present invention, as the hall element 19 or magnetic resistance element is used as a sensing part and such copper winding coil as in the above mentioned conventional sensor is not used, there is an advantage that there is no fear of mis-operating under the influence of an outside electromagnetic induction by high voltage lines embedded under the ground or a transmitting antenna generating strong electromagnetic waves or of being made inoperative by an excess input.

Figure 3:
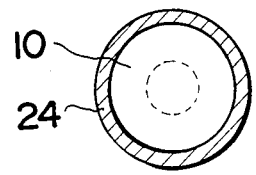
FIG. 3 is a plan view showing an essential part of another embodiment of the sensor of the theft and the like of an automobile of the present invention.
Figure 4:
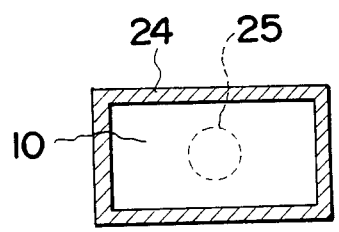
FIG. 4 is a plan view showing an essential part of further another embodiment of the theft and the like of an automobile of the present invention.
Figure 5:
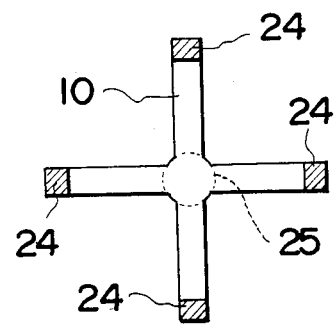
FIG. 5 is a plan view showing an essential part of still further another embodiment of the theft and the like of an automobile of the present invention.
Figure 7:
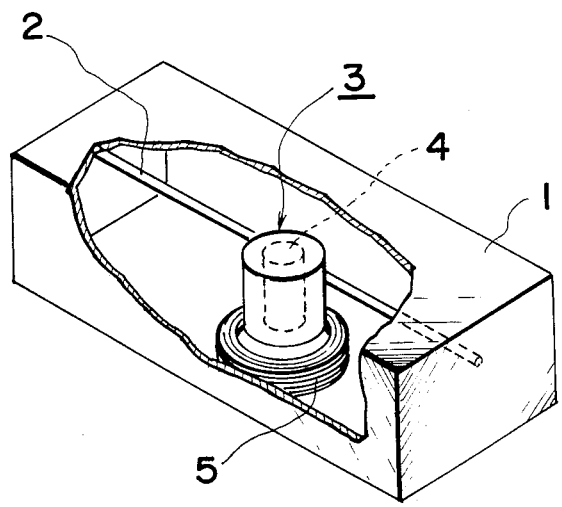
FIG. 7 is a partly sectioned perspective view showing a conventional sensor of the theft and the like of an automobile.

FIGS. 3 to 5 are plan views respectively showing essential parts of other embodiments. These embodiments are different in the form of the elastic film 10 from the above mentioned embodiment shown in FIGS. 1 and 2. In FIGS. 3 to 5, hatched parts 24 show the fixed ends of the elastic film 10. The reference numeral 25 represents a fitting position of the weight 12. The elastic film 10 shown in FIG. 3 is formed to be circular and is fixed on the periphery. The elastic film 10 shown in FIG. 4 is formed to be rectangular and is fixed not only at both ends but also on all the periphery. The elastic film shown in FIG. 5 is formed to be cruciform and is fixed at the respective ends. Thus, in the present invention, the form of the elastic film 10 can be varied. By the way, it is needless to say that the form is not limited to those shown in FIGS. 3 to 5.

Figure 6:
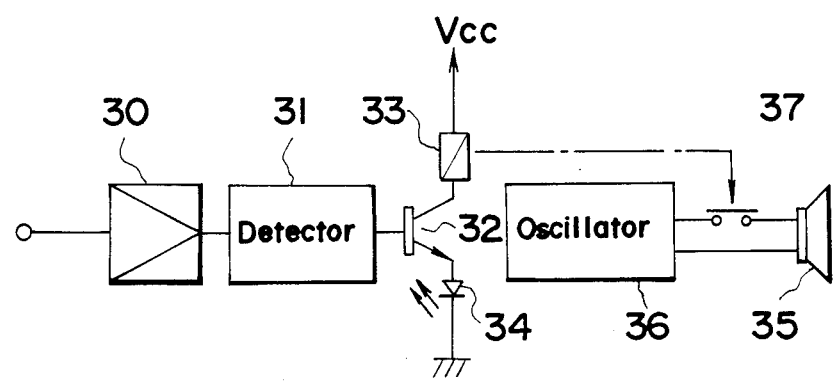
FIG. 6 is an electric circuit diagram showing an example of the outside circuit.

By the way, FIG. 6 shows an example of an outside circuit connected to the sensor of the present invention.

In FIG. 6, the reference numeral 30 represents an amplifier to which the above mentioned lead wires 22 and 23 are connected and into which the output signals of the hall element 19 are put. 31 represents a detector receiving the output signals of the amplifier 30, converting signals above a predetermined level to direct current voltage signals and putting them out. 32 represents a switching transistor in which the output signals of the detector are put into the base. The collector of the switching transistor 32 is connected to a direct current source Vcc through a coil part 33 of a relay and the emitter is earthed through a light emitting diode 34. Further, the reference numeral 35 represents a speaker, 36 represents an oscillator driving said speaker 35 to emit alarming sounds and 37 represents a contact of the above mentioned relay. This contact 37 will conduct when a voltage is impressed on the above mentioned coil part 33. The above mentioned light emitting diode 34 is utilized to adjust the amplifying degree of the amplifier 30 or to adjust the detecting level of the detector 31.

According to this outside circuit, when a sensing signal is obtained from the sensor of the present invention, the above mentioned switching transistor 32 will conduct, a voltage will be impressed on the coil part 33 of the relay, its contact 37 will conduct and an alarming sound will be issued from the speaker 35.

Needless to say, the outside circuit connected to the sensor of the present invention is not limited to the above mentioned formation shown in FIG. 2 and can be of any other formation.

As detailed in the above, according to the present invention, there are obtained effects that, even if the car body is greatly inclined while parked, the sensitivity will not substantially reduce and that there is not fear of mis-operating under the influence of an electromagnetic induction from outside by high voltage lines embedded under the ground or a transmitting antenna generating strong electromagnetic waves and of being made inoperative by an excess input.

What is claimed is:

1. An antitheft sensing device for an automotive vehicle comprises magnetic means and a magnet resistance means for converting the intensity of a magnetic field to a voltage arranged in axial opposition and spaced from each other, said magnet means being mounted substantially at the center of a elastic sheet arranged to be vibrationally responsive to movement of said vehicle.

2. The device according to claim 1, wherein said magnetic resistance means comprises a Hall element.

3. The device according to claim 1, wherein said sheet is in the form of a parallelogram, and mounted at a pair of its opposed edges.

4. The device acording to claim 3, wherein said magnet means includes a weight.

5. The device according to claim 4, wherein said magnet means is a permanent magnet.

6. The device according to claim 5, wherein said weight is of a material having a specific gravity higher than said permanent magnet.

7. The device according to claim 6, wherein said magnet comprises a rod and said weight comprises a cylinder, said rod being secured within said cylinder and mounted within said cylinder.

* * * * *